(12) United States Patent
Singh et al.

(10) Patent No.: US 12,355,716 B2
(45) Date of Patent: Jul. 8, 2025

(54) DETECTING MALICIOUS EMAIL ATTACHMENTS USING CONTEXT-SPECIFIC FEATURE SETS

(71) Applicant: Cisco Technology, Inc., San Jose, CA (US)

(72) Inventors: Abhishek Singh, Morgan Hill, CA (US); Kalpesh Kantilal Mantri, Pune, MA (US)

(73) Assignee: Cisco Technology, Inc., San Jose, CA (US)

( * ) Notice: Subject to any disclaimer, the term of this patent is extended or adjusted under 35 U.S.C. 154(b) by 53 days.

(21) Appl. No.: 18/508,029

(22) Filed: Nov. 13, 2023

(65) Prior Publication Data
US 2025/0158948 A1    May 15, 2025

(51) Int. Cl.
*H04L 51/212* (2022.01)
*H04L 9/40* (2022.01)
*H04L 51/08* (2022.01)

(52) U.S. Cl.
CPC ............ *H04L 51/212* (2022.05); *H04L 51/08* (2013.01); *H04L 63/1483* (2013.01)

(58) Field of Classification Search
CPC .................. H04L 51/212; H04L 51/08; H04L 63/1483; H04L 63/145; G06F 21/56
See application file for complete search history.

(56) References Cited

U.S. PATENT DOCUMENTS

| | | | |
|---|---|---|---|
| 8,566,938 B1 * | 10/2013 | Prakash | H04L 51/212 726/22 |
| 10,581,888 B1 | 3/2020 | Agranonik et al. | |
| 10,601,865 B1 * | 3/2020 | Mesdaq | H04L 63/1425 |
| 2012/0016945 A1 * | 1/2012 | Yu | G06Q 10/107 709/206 |
| 2018/0212985 A1 | 7/2018 | Zadeh et al. | |
| 2019/0020672 A1 * | 1/2019 | Stolfo | H04L 63/145 |
| 2021/0126944 A1 * | 4/2021 | Lesperance | H04L 63/1433 |
| 2021/0264116 A1 | 8/2021 | Thor et al. | |
| 2022/0210188 A1 * | 6/2022 | Grewal | H04L 63/1483 |
| 2022/0279019 A1 | 9/2022 | Kras et al. | |
| 2023/0046412 A1 * | 2/2023 | Greevy | H04L 63/1466 |
| 2023/0171287 A1 * | 6/2023 | Slobodyanuk | H04L 51/212 726/23 |

* cited by examiner

*Primary Examiner* — Johnny B Aguiar
(74) *Attorney, Agent, or Firm* — Lee & Hayes, P.C.

(57) ABSTRACT

This disclosure describes techniques for an email security system to detect a malicious email and take remedial actions in response to the detected malicious email. The techniques described herein may enable the email security system to detect whether an email is malicious based on whether one or more files attached to the email are malicious. In some cases, the email security system determines whether an email attachment file is malicious based on a set of features that are specific to both a classification of the email (e.g., a semantic classification of the email) and a format of the email attachment file.

20 Claims, 8 Drawing Sheets

DETECTING MALICIOUS EMAIL ATTACHMENTS USING CONTEXT-SPECIFIC FEATURE SETS

TECHNICAL FIELD

The present disclosure relates, generally, to techniques for an email security system to detect and mitigate malicious email attacks.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communication between users of electronic devices as email provides users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malware-less attacks. These malicious entities continue to employ more frequent and sophisticated social engineering techniques for deception and impersonation (e.g., phishing, spoofing, etc.). As users continue to become savvier about identifying malicious attacks on email communications, malicious entities similarly continue to evolve and improve attack methods.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
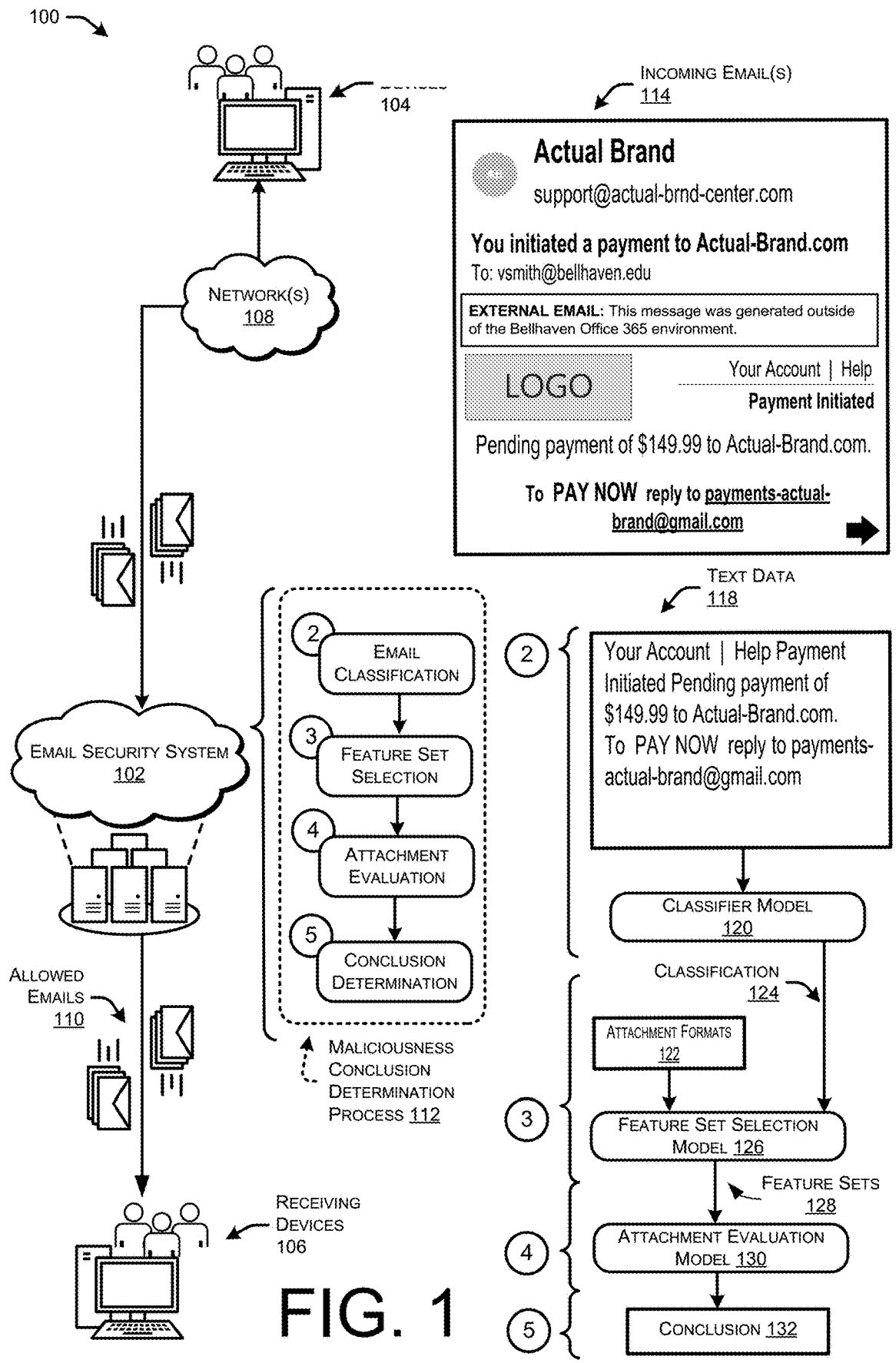
FIG. 1 illustrates a system architecture of an example email security system that generates a maliciousness conclusion for an email and determines whether to perform a remedial action with respect to the email based on the maliciousness conclusion of the email.

This disclosure describes techniques for an email security system to detect a malicious email and take remedial actions in response to the detected malicious email. A method to perform the techniques described herein may include receiving, by a processor, first text data associated with a first email and second text data associated with a second email. The method may further include providing, by the processor, the first text data and the second text data to a first model. The method may further include receiving, by the processor, a first classification associated with the first email and a second classification associated with the first email from the first model. The method may further include determining, by the processor, that the first email includes a first attachment file associated with a first format. The method may further include determining, by the processor, that the second email includes a second attachment file associated with the first format. The method may further include determining, by the processor, a first feature set associated with the first classification in relation to the first format and a second feature set associated with the second classification in relation to the first format, wherein the first feature set comprises a first feature and the second feature set excludes the first feature. The method may further include determining, by the processor, that the first attachment file and the second attachment file both satisfy a rule associated with the first feature. The method may further include determining, by the processor, that the first email is malicious and the second email is not malicious. The method may further include preventing, by the processor, transmission of the second email to a first destination device. The method may further include enabling, by the processor, transmission of the second email to a second destination device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for an email security system to detect a malicious email and cause remedial actions to be performed in response to the detected malicious email. The techniques described herein may enable the email security system to detect whether an email is malicious based on whether one or more files attached to the email are malicious. If an email is detected to be malicious, the email security system may perform one or more remedial actions accordingly. Examples of remedial actions include blocking the email from being displayed in the inbox of the receiver, harvesting data about a malicious email to generate a maliciousness detector model, storing attacker data associated with a malicious email in a blacklist associated with the email security system, reporting attacker data associated with a malicious email to authorities, and/or the like.

In some cases, the email security system determines whether an email attachment file is malicious based on a set of features that are specific to both a classification of the email (e.g., a semantic classification of the email) and a format of the email attachment file. For example, the email security system may evaluate a text file that includes an embedded executable object differently depending on whether the text file is attached to an invoice-related email or an installation-related email. As another example, the email security system may evaluate a spreadsheet file that includes embedded macros differently depending on whether the spreadsheet file is attached to a financial report email or a personal email. As another example, the email security system may evaluate a compressed file containing images differently depending on whether the compressed file is attached to a photography portfolio email or a family photo-sharing email. As another example, the email security system may evaluate an executable file differently depending on whether the executable file is attached to a software release announcement email or a personal email. As another example, the email security system may evaluate a portable document format (PDF) document differently depending on whether the PDF document is attached to a financial statement email or a personal receipt email. As another example, the email security system may evaluate a data file differently depending on whether the data file is attached to a customer report email or a personal genealogy research email.

In some cases, the email security system may determine whether an email attachment is malicious by performing the following operations: (i) determining a classification associated with the corresponding email, (ii) determining a format associated with the email attachment, (iii) retrieving a set of features specific associated with both the classification and the format, (iv) applying the set of features to the email attachment to generate a set of corresponding indicators, and (v) determining whether the email attachment is malicious based on the set of indicators. Aspects of these operations are described in greater detail below.

In some cases, the email security system may determine a classification associated with an email. The classification may represent a semantic context associated with the email. In some cases, the email security system determines the classification associated with an email based on at least one of: (i) the email's header data, (ii) the email's subject, (iii) the email's body content, or (iv) data associated with one or more files attached to the email (e.g., data extracted using one or more attachment parsing operations). Examples of candidate email classifications include a finance-related classification (e.g., including payment emails and/or bank communication emails), a classification related to information and/or communication mediums (e.g., including fax emails, memorandum emails, and/or voice-over-IP (VOIP) content emails), a classification related to office emails, a classification related to invoices (e.g., including emails with bills and/or receipts), a classification related to delivery matters (e.g., including logistics-related emails), and a classification related to call-to-action emails.

In some cases, to determine the classification associated with an email, the email security system may use at least one of the distribution of words and/or n-grams in the content data (e.g., body data and/or subject data) associated with the email, an inferred sentiment label associated with the email, or the output of processing the email using one or more one or more natural language processing models and/or machine learning models. In some cases, a machine learning model may be configured to process an email's body content, header data (e.g., sender email), and/or subject line to determine a classification associated with the email. Examples of machine learning models that may be used to determine classifications for emails include a model that includes a neural network, a model that includes a Latent Dirichlet Allocation (LDA) network, an attention-based model (e.g., a model that uses representations generated by an attention-based encoder model), and a transformer-based model (e.g., a model that uses representations generated by a transformer-based model).

In some cases, to generate a classification associated with an email, a machine learning model generates C confidence scores, where each confidence score represents a predicted likelihood that the email belongs to a respective one of C candidate classifications. In some cases, the email security system may assign the candidate classification that has the highest confidence score among the C confidence scores to the email. In some cases, the email security system may assign the candidate classification that has the highest confidence score among the C confidence scores to the email if the highest confidence score exceeds a threshold (e.g., a threshold determined based on a measure of central tendency associated with the C confidence scores). In some cases, the email security may assign each candidate classification whose respective confidence score exceeds a threshold to the email. In some cases, if no candidate classification exceeds the threshold, the email security system may refrain from assigning a classification to the email. Accordingly, in some cases, the email security system may assign zero or more (e.g., two or more) classifications to an email.

In some cases, the email security system determines a format associated with an email attachment. The format of a file may be determined based on one or more metadata fields associated with the file, such as one or more of the file's extension, the file's subject matter, the type of software application within which the file can be opened, the file's metadata tags, or other indicators within the file itself. Examples of file formats include an executable file types (e.g., files with extensions such as .exe, .com, .scr, .bat, and/or the like), a document file format (e.g., files with extensions such as .doc, .docx, .pdf, .rtf, and/or the like), a spreadsheet file format (e.g., files with extensions such as .xls, .xlsx, .csv, and/or the like), an archive file format (e.g., files with extensions such as .zip, rar, .7z, and/or the like), a media file type (e.g., files with extensions such as .mp3, .mp4, .avi, and/or the like), an image file type (e.g., files with extensions such as .jpg, .png, .gif, and/or the like), a script file type (e.g., files with extensions such as .js, .vbs, .ps1, and/or the like), an email file type (e.g., files with extensions such as .eml, .msg, and the like), and a web document format (files with extensions such as .html, .htm, and/or the like).

In some cases, the email security system retrieves a set of features associated with an email's classification and an email attachment's format. A feature may define an attribute of an attachment that may be used to predict the likelihood that the attachment is malicious. For example, a feature may define a condition that, when satisfied by an email attachment, provides a signal indicating that the email attachment is malicious in the context of the email's classification. Examples of such maliciousness-related features include a feature associated with whether a file includes a macro, an encrypted segment, one or more shellcodes, one or more embedded objects, one or more malware indicators (e.g., one or more application programming interface (API) calls), one or more uniform resource locators (URLs), one or more URL-related tags (e.g., an <a tag> or a <form tag> in a Hyper-Text Markup Language (HTML) file), one or more script blocks (e.g., an <script tag> in an HTML file), and/or one or more text segments. Other examples of maliciousness-related features relate to features associated with whether a file is encrypted, a count of structure tags in a file (e.g., obj, endobj, stream, endstream, xref, trailer, and/or startxref tags in a PDF file), a count of JavaScript tags in a file (e.g., /JS and/or /JavaScript tags in a PDF file), a count of pages in a file, a count of launch tags in a file (e.g., /AA, /OpenAction, /Launch, and/or /EmbeddedFile tags in a PDF file), a count of tags in a file (e.g., /ObjStm ta, /AcroForm, /JBIG2Decode, /RichMedia, and/or /XFA tags in a PDF file), whether a file is an executable file, and/or whether a file (e.g., an archive file) extracts one or more internal files and/or one or more internal filenames.

For example, a maliciousness-related feature may represent whether an Object Linking and Embedding (OLE) file includes a macro (e.g., a Visual Basic for Applications (VBA) macro). In some cases, macros may be used by malware files to execute malicious code when files are opened. Accordingly, in some cases, the presence of a macro within an OLE file indicates a higher likelihood that the OLE file is malicious.

As another example, a maliciousness-related feature may represent whether an OLE file is encrypted. In some cases, encryption may be used by malware authors to evade static signature-based detection solutions. Accordingly, in some cases, if an OLE attachment is encrypted, the likelihood that the attachment is malicious may be increased.

As another example, a maliciousness-related feature may represent whether an OLE file includes one or more shellcodes. A shellcode may be code used to execute commands when a file is opened. The presence of a shellcode within an OLE file may indicate that the file likely contains malware designed to exploit a system vulnerability, such as a vulnerability in the program that opens the file. When the OLE file is opened, the shellcode may enable the malware to run without the user's knowledge. By including shellcode payloads in OLE files, attackers may be able to distribute malware capable of executing malicious commands on target systems. Accordingly, in some cases, if an OLE attachment has one or more shellcodes, the likelihood that the attachment is malicious may be increased.

As another example, a maliciousness-related feature may represent whether an OLE file includes one or more embedded objects. In some cases, because OLE files support embedding various types of objects like images, audio files, and/or other document formats, malware authors may embed malicious files or code by taking advantage of such object linking and embedding capabilities. For example, an attacker may embed a malicious executable and/or script file within a Word document sent as an email attachment. When the document is opened, the embedded object may execute and install malware or enable other malicious actions. Accordingly, in some cases, if an OLE attachment has one or more embedded objects, the likelihood that the attachment is malicious may be increased.

As another example, a maliciousness-related feature may represent whether an OLE file includes one or more malware-related indicators such as API calls and/or embedded portable executable (PE) files. In some cases, malware attacks may use operating system API calls to execute malicious actions like downloading additional payloads, modifying system configurations, and/or transmitting data from the target system. Accordingly, in some cases, presence of API call patterns commonly associated with malware activity within an OLE file may indicate that the OLE file contains malicious code. In some cases, the presence of API calls to suspicious API functions like URLDownloadToFile, CreateRemoteThread, and/or WriteProcessMemory may signify that the corresponding file may be malicious. Accordingly, in some cases, if an OLE attachment has one or more API calls and/or one or more suspicious API calls, the likelihood that the attachment is malicious may be increased. Moreover, the presence of one or more PE files within an OLE file may (at least in some contexts) indicate that the OLE file is malicious, because legitimate OLE files typically do not need to embed executable binaries in many contexts.

As another example, a maliciousness-related feature may represent whether an HTML file includes URLs and/or the number of the URLs within the HTML file. Malicious HTML files may contain links to external websites or resources as part of a maliciousness attack chain. This may enable the HTML file to redirect victims to phishing pages, sites hosting malware, and/or other web-based malicious content. Accordingly, in some cases, the email security system may determine whether an HTML file is malicious based on whether the HTML includes any URLs and/or how many URLs are in the HTML document. In some cases, the total number of URLs present in an HTML file can be used to determine whether the document is potentially malicious. For example, an unusually high number of URLs may indicate an attempt to evade detection by distributing malicious content across multiple domains. Additionally, the specific URL strings included in an HTML document may be analyzed to detect common patterns found in malicious sites. For example, features may be extracted that identify the presence of Internet Protocol (IP) addresses, non-standard ports, suspicious domain names, encoded URLs, and/or other URL patterns frequently associated with malicious email attacks.

As another example, a maliciousness-related feature may represent whether an HTML file includes a script block (e.g., a segment with a <script tag>) and/or the number of script blocks within the HTML file. In some cases, malicious HTML files may contain JavaScript code to exploit vulnerabilities in browsers and plugins and/or retrieve malicious payloads from target systems. In some cases, malicious HTML files include a large number of scripts (e.g., a large number of obfuscated scripts). In some cases, the presence of a high (e.g., a threshold-satisfying) number of script blocks and/or a high number of obfuscated script blocks relative to the rest of the content in an HTML file suggests that the HTML file may be malicious. In some cases, the maliciousness-related feature may represent the size, complexity, and/or source of individual script blocks in an HTML file, because large and complex scripts may be used to conceal malware-enabling routines (e.g., malware-downloading routines).

As another example, a maliciousness-related feature may represent whether an HTML file includes an obfuscated script and/or the number of obfuscated scripts within the HTML file. In some cases, obfuscation may make it harder for security tools to statically analyze and verify scripts. Accordingly, in some cases, detecting obfuscated code and/or a high ratio of obfuscated code indicates that an HTML file may be malicious.

As another example, a maliciousness-related feature may represent a count of structure tags (e.g., obj, endobj, stream, endstream, xref, trailer, and/or startxref tags) in a PDF file. In some cases, structure tags represent the internal structure of a PDF file. In some cases, presence of a high count of structure tags may indicate attempts to conceal or obfuscate code, as excess structural complexity is not normally needed in legitimate PDFs. As used in the present disclosure, the term "high" may indicate a measure (e.g., an amount, a count, and/or a ratio) that satisfies a predefined threshold.

As another example, a maliciousness-related feature may represent a count of JavaScript tags (e.g., /JS and/or/ JavaScript tags) in a PDF file. JavaScript tags may indicate the presence of JavaScript code that is executed when a PDF document is opened. In some cases, malicious PDF documents may use obfuscated JavaScript exploits as part of an attack chain. Accordingly, in some cases, the presence of a high number of JavaScript tags in a PDF file may indicate that the PDF file may be malicious.

As another example, a maliciousness-related feature may represent a count of pages in a PDF file. In some cases, malicious PDF files often contain very few pages with minimal legitimate content. Accordingly, in some cases, a low page count may signify a document used to distribute malware rather than a normal document intended for presentation of legitimate content. Thus, in some cases, the presence of a few number of pages (e.g., a number of pages that falls below a threshold) may (e.g., in some contexts) indicate that the PDF file may be malicious.

As another example, a maliciousness-related feature may represent a count of launch tags (e.g., /AA, /OpenAction, /Launch, and/or an /EmbeddedFile tags) in a PDF file. Launch tags may launch scripts and/or executables when a PDF document is opened. Accordingly, malicious attacks may use launch tags to launch malicious scripts and/or executables. Therefore, the presence of a launch tag and/or the presence of a threshold-satisfying number of launch tags within a PDF file may indicate that the PDF file is malicious (e.g., downloads malicious content and/or maliciously transmits content using launched scripts and/or executables).

As another example, a maliciousness-related feature may represent a count of potentially suspicious tags (e.g., /ObjStm, /AcroForm, /JBIG2Decode, /RichMedia, and/or /XFA tags) in a PDF file. The presence of a high number of potentially suspicious tags within a PDF file may indicate that the PDF file may be malicious. The list of potentially suspicious tags may be defined by configuration data associated with the email security system.

As another example, a maliciousness-related feature may represent whether a file is an executable file. In some cases, malicious attacks may heavily use executable files to execute malicious code on target systems. In some cases, detecting an executable file type provides a clear and/or unequivocal signal that the attachment is likely malicious. In some cases, an executable attachment is always marked as malicious. In some cases, an executable attachment is marked as malicious if it is attached to an email that has a qualifying classification, where the set of qualifying email classifications may be defined by configuration data associated with the email security system.

As another example, a maliciousness-related feature may represent whether an archive file extracts one or more internal files and/or filenames. In some cases, malware authors may use internal files to conceal payloads. In some cases, the presence of an archive file with internal files and/or with internal filenames (e.g., "password.txt") may signify attempts to retrieve and transmit data to a malicious attacker. Accordingly, in some cases, if an archive file attachment has one or more internal files and/or filenames, the likelihood that the attachment is malicious may be increased.

In some cases, given an email attachment, the email security system selects a set of maliciousness-related features applicable to the email attachment. The feature set associated with an email attachment may be specific to the combination of the classification (e.g., semantic classification) associated with the email that contains the attachment and the file format of the attachment. This allocation of feature sets to classification-format categories represents the understanding that a feature of a file format may be indicative of malicious activity if the file is used in a first context (e.g., attached to a file with a first classification) and not indicative of malicious activity if the file is used in a second context (e.g., attached to a file with a second classification).

For example, in some cases, the presence of JavaScript code may be considered a malicious indicator for PDF files attached to emails classified as banking-related, but not in PDF files attached to emails classified as newsletters. This may be because Javascript code in PDF files attached to banking emails may allow malicious actors to fingerprint the user, collect sensitive information, and/or initiate financial transactions without the user's consent. However, JavaScript code in PDF files attached to newsletter emails may be used for web analytics and/or user interface enhancement purposes. Accordingly, the banking-related classification provides context that renders the presence of JavaScript code significant for maliciousness detection with respect to a PDF file, while the newsletter classification provides context that renders the presence of JavaScript code insignificant for maliciousness detection with respect to a PDF file.

As another example, in some cases, the presence of a threshold-satisfying number of links in an HTML file attached to a marketing email may be deemed to indicate likely malicious intent, while the presence of a threshold-satisfying number of links in an HTML file attached to a travel itinerary email may be deemed not to indicate likely malicious content. This may be because having a higher number of links in an HTML attachment of a travel itinerary email may be deemed more usual, because travel itinerary HTML files are expected to include links to multiple service providers (e.g., airlines, hotels, rental car agencies, and/or the like). Accordingly, the marketing-related classification provides context that renders the presence of a threshold-satisfying number of links as significant for maliciousness detection with respect to an HTML file, while the travel itinerary classification provides context that renders the presence of a threshold-satisfying number of links as insignificant for maliciousness detection with respect to an HTML file.

As another example, in some cases, the presence of macros may be considered a malicious indicator for text files (e.g., Microsoft Word files) attached to resume-related emails, but not in text files attached to work project emails. This may be because macros are understood to be heavily used in text files associated with work projects to automate project-related tasks. Accordingly, the resume-related classification provides context that renders the presence of macros as significant for maliciousness detection with respect to a Word file, while the project-related classification provides context that renders the presence of macros as insignificant for maliciousness detection with respect to a Word file.

In some cases, the set of features associated with a file having a text format may, in at least some contexts (e.g., in relation to at least some email classifications), include a feature representing whether such a file includes at least one of an automated code or an embedded object. In some cases, the set of features associated with a file having a web document format (e.g., an HTML file) may, in at least some contexts (e.g., in relation to at least some email classifications), include a feature representing whether such a file includes at least one of an embedded object, encrypted data, automated redirection code, or an external link. In some cases, the set of features associated with a file may include a feature representing whether the file includes an input-receiving field (e.g., a textbox).

Accordingly, in some cases, to determine whether an attachment to an email is malicious, the email security system may retrieve a set of features specific to the email's classification and the attachment's format. The features may represent attributes and/or patterns that indicate whether a file with a given format is malicious when attached to an email with a given classification. For example, for a PDF file attached to finance-related email, the relevant feature set may indicate a feature representing whether the PDF file includes JavaScript code, a feature representing whether the PDF file size exceeds a threshold, a feature representing whether the PDF file contains any embedded executable files, and/or a feature representing the number of links to external domains within the PDF file. As another example, for a text document attached to an email having an invoice classification, the relevant feature set may include a feature representing whether the text document contains any macros, a feature representing whether the text document contains any embedded executable files, and/or a feature representing the number of hyperlinks to external domains in the text file. As another example, for an audio file attached to an email related to VoIP communications, the relevant feature set may include a feature representing the audio codec technique used to generate the audio file and/or a feature representing whether the audio file contains any embedded executable code segments.

In some cases, the email security system applies a feature set selected for an email attachment to the email attachment to generate a set of maliciousness indicators. A maliciousness indicator may represent whether the attachment satisfies a rule that, when satisfied by the email attachment, indicates that the email attachment is malicious. For example, a maliciousness indicator may indicate whether a PDF attachment to a finance-related email includes a macro or an embedded object. If a PDF attachment to a finance-related email includes either or both of a macro or an embedded object, then a maliciousness indicator associated with the attachment may have an affirmative value, indicating that the attachment is determined to be malicious.

As another example, a maliciousness indicator for a text attachment to an email classified as an invoice may indicate whether the text document contains any embedded executables or URLs. If the text document contains one or both of an embedded executable or a URL, the corresponding maliciousness indicator would be affirmative, indicating that the attachment is determined to be malicious.

As yet another example, a maliciousness indicator for an audio file attachment on a VOIP-related email may indicate whether the audio file metadata fails to match the actual audio content. If there is a mismatch, then a maliciousness indicator associated with the attachment may have an affirmative value, indicating that the attachment is determined to be malicious.

In some cases, given an email attachment that is associated with a corresponding format and a corresponding email classification, a set of R rules are applied to the email attachment, where the set of R rules are defined for evaluating email attachments having the corresponding format that are attached to emails having the corresponding email classification. In some cases, the result of applying the R rules to the email attachment is R maliciousness indicators, where each maliciousness indicator of the R maliciousness indicators may represent whether the result of applying a corresponding one of the R rules to the email attachment returns a result indicating that the email attachment is malicious.

Examples of such maliciousness determination rules include a rule indicating that a PDF attachment in a finance-related email is malicious if the attachment contains JavaScript code and has more than three external links, a rule indicating a text document attachment in an invoice-related email is malicious if the attachment contains macros and embedded executables, a rule indicating an audio attachment in a training-related email is malicious if the metadata associated with the attachment does not match the file's content and if the attachment contains obfuscated code, and a rule indicating an attachment is malicious if the result of processing the feature set associated with the attachment using a machine learning model generates an output indicating that the attachment is malicious.

As these examples illustrate, a maliciousness indicator may be determined by applying a rule to an email attachment, where the rule may require particular values for particular features in the set of maliciousness-related features associated with the attachment, and where the feature set associated with the email attachment is specific to the attachment's format and the corresponding email's classification. In other words, in some cases, the rules and features used to determine whether an attachment is malicious are tailored to both the format of the attachment and the semantic context of the email as captured by its classification. In some cases, this approach allows for a more precise and context-aware assessment of maliciousness of an attachment file, by ensuring that the indicators are based on behaviors and properties that are known to suggest malicious intent specifically for the given format-classification combination, rather than a set of generic indicators.

In some cases, a maliciousness indicator for an email attachment may be determined using a machine learning model. For example, in some cases, all or some of the feature set associated with the email attachment may be provided as input(s) to a machine learning model and the output of the machine learning model may be used to determine a maliciousness indicator associated with the email attachment. In some cases, the output of the machine learning model may be a value representing a predicted likelihood that the email attachment is malicious. In some cases, the email security system may determine that an email attachment is associated with an affirmative maliciousness indicator (e.g., indicating that the email attachment is predicted to be malicious) if the predicted likelihood value associated with the email attachment, as generated by the machine learning model, exceeds a threshold. Accordingly, in some cases, the set of maliciousness indicators associated with an email attachment may include at least one of one or more rule-based maliciousness indicators or one or more maliciousness indicators determined using one or more machine learning models.

In some cases, the email security system uses the set of maliciousness indicators associated with an email attachment to determine whether the email attachment is malicious. In some cases, the email security system determines that an email attachment is malicious is at least one maliciousness indicator associated with the email attachment has an affirmative value (e.g., indicating that the email attachment is predicted to be malicious). In some cases, the email security system determines that an email attachment is malicious if at least N maliciousness indicators associated with the email attachment have affirmative values (e.g., indicating that the email attachment is predicted to be malicious), where N may be defined by configuration data associated with the email management system. In some cases, the email security system determines that an email attachment is malicious if at least M maliciousness indicators associated with the email attachment have affirmative values (e.g., indicating that the email attachment is predicted to be malicious), where M may be defined based on a threshold ratio of all maliciousness indicators associated with the email attachment, and where the threshold ratio may be defined by configuration data associated with the email management system.

In some cases, the set of maliciousness indicators associated with an email attachment may be combined using a weighted sum and the weighted sum may be used to determine if the email attachment is malicious. For example, the email security system may determine that an email attachment is malicious if the weighted sum exceeds a threshold. The weights associated with the maliciousness indicators may be determined based on predictive values of the corresponding indicators in relation to predicting maliciousness outcomes as observed in historical data. For example, if processing past labeled attachments shows that, for PDF attachments of finance-related emails, the presence of JavaScript code is a significant predictor of attachment maliciousness, then the weights associated with maliciousness indicators that are determined based on JavaScript code presence in PDF attachments of finance-related emails may be increased. The weights for the indicators may be tuned over time as more emails and attachments are analyzed, allowing the system to continually improve the weighting to reflect new insights around which indicators have the highest predictive value for flagging malicious attachments in relation to various formats and classifications.

In some cases, the set of maliciousness indicators associated with an email attachment may be processed using a machine learning model and the output of the machine learning model may be used to determine if the email is malicious. For example, the set of indicators may be provided as input features to a random forest classifier that has been trained to predict whether an email attachment is malicious based on those indicators. The output of the random forest model may then be used to determine whether the email attachment is malicious.

In some cases, the email security system may determine whether an email is malicious based on whether the email includes one or more malicious email attachments. For example, the email security system may determine that an email is malicious if the email includes any attachments that are determined to be malicious. As another example, the email security system may determine that an email is malicious if a percentage and/or number of the attachments included in the email that are determined to be malicious exceeds a threshold. If an email is determined to be malicious, one or more remedial actions may be performed. Examples of remedial actions include blocking the email from being displayed in the inbox of the receiver, harvesting data about a malicious email to generate a maliciousness detector model, storing attacker data associated with a malicious email in a blacklist associated with the email security system, reporting attacker data associated with a malicious email to authorities, and/or the like.

In some cases, the email security system determines whether an email is malicious (e.g., is part of a multi-stage malware attack) by extracting the content of the email and processing the content using a natural language processing model. In some cases, the email security system determines whether an email is malicious (e.g., is part of a multi-stage malware attack) based on the anomaly in the metadata from email headers such as the difference in the mail-from and reply-to email addresses. In some cases, In some cases, the email security system determines whether an email is malicious (e.g., is part of a multi-stage malware attack) by performing a deep file scanning of the email attachments. In some cases, maliciousness-related features are defined based on filenames and/or file extensions associated with email attachments.

In some cases, maliciousness-related features are defined based on encodings of email header data. In some cases, an embedded executable in a text attachment (e.g., a Microsoft Word attachment) to an installation-related email may be irrelevant to maliciousness determination, while an embedded executable in a text attachment (e.g., a Microsoft Word attachment) to an installation-related email may be relevant to maliciousness determination. Accordingly, in some cases, contextual analysis of an email can be used to select a feature set for correlation with the output of deep file analysis of the attachments.

In some cases, the techniques described herein improve the security of computer systems and/or computer networks by enabling more robust detection of malicious emails via evaluating an email attachment based on both the semantic context of the email and the specific format of the attachment file. By selecting attachment feature sets tailored to the combination of email classification and file format, the email security system can identify malicious indicators that are tailored to the specific context and type of an email attachment. For example, the presence of JavaScript code may signal that a PDF attachment to a banking email is malicious, but the same data point may not be deemed relevant in the context of a PDF attachment to a newsletter. In some cases, this context-aware evaluation of email attachments allows the email security system to avoid false determinations of maliciousness and detect malicious attachments that generic detectors would miss.

In some cases, the techniques described herein improve computational efficiency and/or speed of email attachment monitoring by refraining from evaluating an email attachment in relation to features that are irrelevant to the attachment's format and/or context. In some cases, by only analyzing an email attachments using features specific to the attachment's format and context, the techniques described herein avoid using computational resources to apply generic yet irrelevant features to the email attachment. This approach improves computational efficiency of email attachment monitoring relative to an approach that applies a generic set of features to all attachments. In some cases, instead of broadly applying a generic set of features to all attachments, the system may focus its processing on a target subset of features specific to each attachment's type and context. This selective feature application may limit the use of computational resources needed for email attachment monitoring.

In some cases, the techniques described herein enable effectively balancing operational load across an email security system. In some cases, the selective use of format-specific feature sets enables the system to escalate scrutiny of attachments with properties known to be suspicious for a file type, while relaxing scrutiny of attachments with common benign patterns. For example, the email security system may escalate scrutiny of OLE attachments with macros from unusual senders while relaxing scrutiny of multimedia attachments from known senders. This relaxation may help the email security system balance its operational load in a more effective way. For example, relaxing scrutiny of a subset of multimedia attachments may be significant from an operational balancing standpoint because processing multimedia files may be overly computationally expensive, such that reducing the need for scrutiny of a subset of multimedia files enables faster and/or deeper scrutiny of a large number of OLE attachments. Accordingly, the techniques described herein may improve operational load balancing in relation to an email security system. This improvement may be more significant for email security systems with large amounts of operational load.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram 100 of an example email security system 102 that generates a maliciousness conclusion for an email and determines whether to perform a remedial action with respect to the email based on the maliciousness conclusion of the email. The maliciousness conclusion associated with an email may be a determination about whether the email is predicted to be malicious.

In some instances, the email security system 102 may be a scalable service that includes and/or runs on devices housed or located in one or more data centers, that may be located at different physical locations. In some examples, the email security system 102 may be included in an email platform and/or associated with a secure email gateway platform. The email security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email security system 102 may be associated with an email service platform may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store, and review emails in inboxes, manage and segment contact lists, build email templates, manage and modify inboxes and folders, scheduling, and/or any other operations performed using email service platforms.

The email security system 102 may be included in, or associated with, the email service platform. For instance, the email security system 102 may provide security analysis for emails communicated by the email service platform (e.g., as a secure email gateway). As noted above, the second device 104 may comprise a different domain and/or pool of resources used to host the email security system 102.

The email service platform may provide one or more email services to users of user device to enable the user devices to communicate emails over one or more networks 108, such as the Internet. However, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include sending devices 104 that send emails and receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive incoming emails 114 that are destined for the receiving devices 106 that have access to inboxes associated with destination email addresses managed by, or provided by, the email service platform. That is, emails are communicated over the network(s) 108 to one or more recipient servers of the email service platform, and the email service platform determines which registered user the email is intended for based on email information such as "To," "Cc," Bcc," and the like. In instances where a user of the receiving device 106 have registered for use of the email security system 102, an organization managing the user devices 104/106 has registered for use of the email security system 102, and/or the email service platform itself has registered for use of the email security system 102, the email service platform may provide the appropriate emails for pre-preprocessing of the security analysis process.

Generally, the email security system 102 may determine a maliciousness conclusion for an incoming email 114 using the maliciousness conclusion determination process 112. The maliciousness conclusion may then be used to determine whether an incoming email 114 should be blocked or instead should be provided to the receiving devices 106 as an allowed email 110. To determine the maliciousness conclusion, the email security system 102 may analyze the email metadata and/or email attachments associated with the incoming email 114 with reference to the security policies to determine whether or not the email metadata and/or email attachments violate one or more security policies that indicate the respective email is potentially malicious. In some instances, rule-based heuristics may be developed to identify malicious emails based on different words, patterns, and/or other information included in the emails and/or in the email attachments. As another example, machine learning model(s) may be trained using emails where malicious emails are labeled as malicious and benign or normal emails are labeled as benign. The machine learning model(s) and/or the rule-based heuristics may output probabilities that emails are malicious or may simply output a positive or negative result as to whether the emails are malicious or not.

As depicted in FIG. 1, at operation (1), the email security system 102 may receive an incoming email 114 with a set of attachments. At operation (2), the email security system 102 may determine a classification 124 for the incoming email 114. In some cases, the email security system 102 processes the content and/or metadata associated with the incoming email 114, such as the text data 118 associated with the incoming email 114, using a classification model 120 to determine the classification 124. The classification 124 may represent a semantic context and/or a topic associated with the incoming email 114. For example, the email security system 102 may use natural language processing models to classify the incoming email 114 finance-related, project-related, marketing-related, etc. In some cases, the email security system 102 generates two or more classifications for the incoming email 114.

At operation (3), the email security system 102 may select, for each attachment of the incoming email 114, a set of features based on the classification 124 and the attachment's format. In some cases, a feature set selection model 126 generates feature sets 128 for the email attachments based on the attachment file formats 122 and the classification 124. In some cases, the email security system 102 first identifies a file format 122 of an attachment and then selects a specific set of features tailored to evaluating that file format in the context of the email's classification. For example, for a PDF attachment to a finance-related email, the email security system 102 may select features related to the presence of JavaScript code, the number of embedded links, the attachment's page count, and/or the like.

At operation (4), the email security system 102 generates a maliciousness determination for each attachment by applying the feature set associated with the attachment to the attachment. In some cases, an attachment evaluation model 130 uses the feature sets 128 associated with the attachments along with the content data and/or metadata associated with those attachments to generate maliciousness determinations for those attachments. Each maliciousness determination may represent a prediction about whether a corresponding attachment is malicious. In some cases, the email security system 102 an attachment's feature set to the attachment to generate a set of indicators that whether the attachment satisfies conditions for one or more maliciousness conditions. In some cases, if the attachment includes at least one affirmative indicator, then the email security system 102 determines that the attachment is malicious.

At operation (5), the email security system 102 determines a maliciousness conclusion 132 about whether the incoming email 114 is malicious based on the maliciousness determinations for the email's attachments. In some cases, the email security system 102 determines that the incoming email 114 is malicious if any one of the email's attachments is determined to be malicious. In some cases, the email security system 102 determines that the incoming email 114 is malicious if at least a threshold number of the email's attachments are determined to be malicious. In some cases, if the email security system 102 determines that the incoming email 114 is not malicious, the email security system 102 transmits the incoming email 114 to a receiving device 106 as an allowed email 110. In some cases, if the email security system 102 determines that the incoming email 114 is malicious, the email security system 102 performs one or more remedial actions with respect to the incoming email 114. Examples of remedial actions include blocking the incoming email 114 from being displayed in an inbox of the receiver, harvesting data about the incoming email 114 to generate a maliciousness detector model, storing attacker data associated with the incoming email 114 in a blacklist associated with the email security system 102, reporting attacker data associated with the incoming email 114 to authorities, and/or the like.

Figure 2:
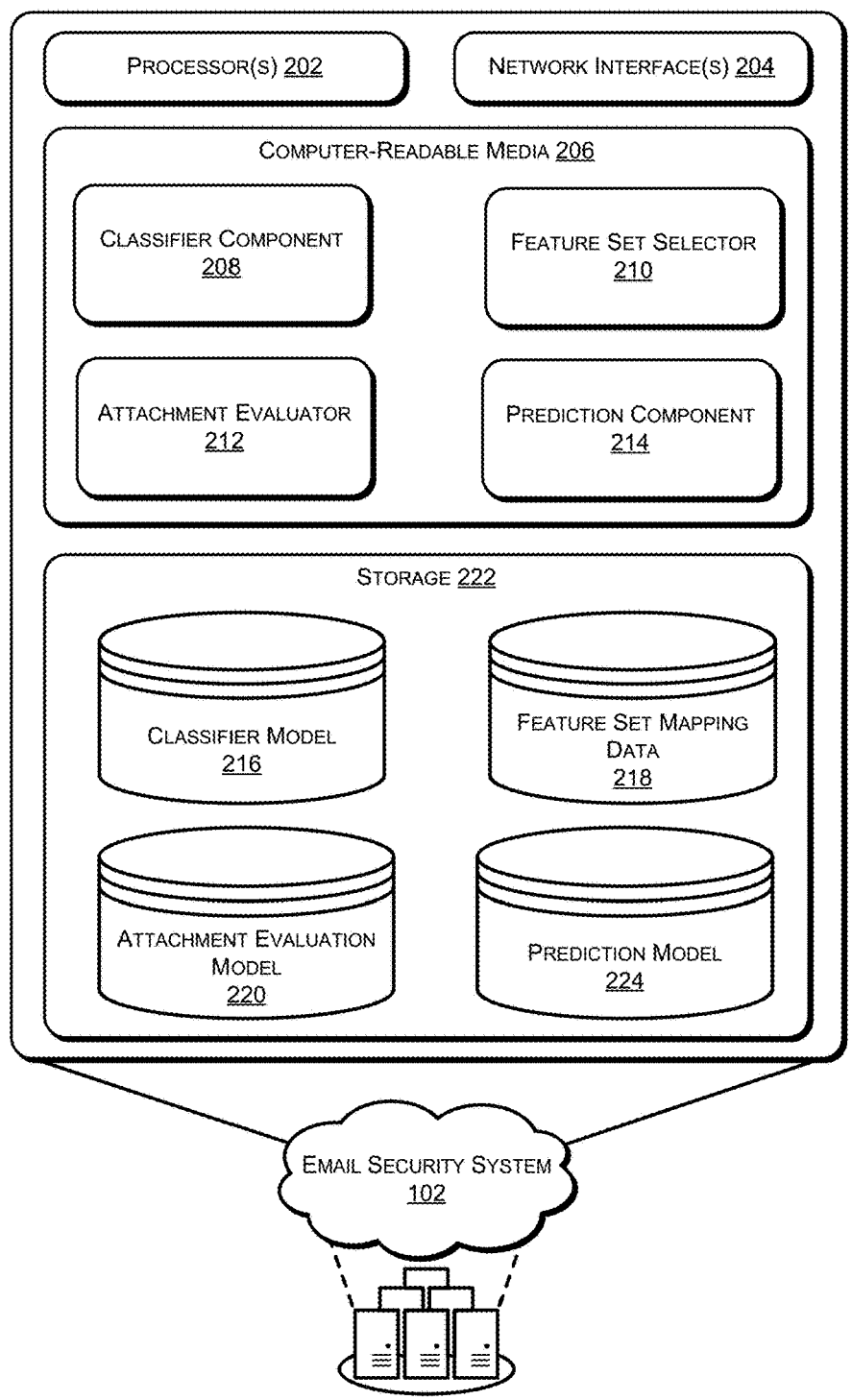
FIG. 2 illustrates a component diagram of an example email security system.

FIG. 2 illustrates a component diagram 200 of the example email security system 102 of FIG. 1. As depicted in FIG. 1, the email security system 102 may include one or more hardware processors 202 (processors), which may be one or more devices configured to execute one or more stored instructions. The processor(s) 202 may comprise one or more cores. Further, the email security system 102 may include one or more network interfaces 204 configured to provide communications between the email security system 102 and other devices, such as the sending device(s) 104, receiving devices 106, and/or other systems or devices associated with an email service providing the email communications. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The email security system 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the email security system 102. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the email security system 102 may include storage 222 which may comprise one, or multiple, repositories or other storage locations for persistently storing and managing collections of data such as databases, simple files, binary, and/or any other data. The storage 222 may include one or more storage locations that may be managed by one or more storage/database management systems. For example, the storage 222 may store a classifier model 216 that is configured to determine a classification for an email, for example based on at least one of: (i) the email's header data, (ii) the email's subject, (iii) the email's body content, or (iv) data associated with one or more files attached to the email (e.g., data extracted using one or more attachment parsing operations). As another example, the storage 222 may store feature set mapping data 218 that maps each pairing of an email classification and an attachment format to a set of applicable maliciousness-related features. As another example, the storage 222 may store an attachment evaluation model 220 that is configured to apply the applicable feature set associated with an email attachment to determine whether the attachment is malicious. As a further example, the storage 222 may store a prediction model 224 that is configured to process data associated with an email, such as maliciousness predictions associated with the email's attachments, to determine whether the email is malicious.

The computer-readable media 206 may include portions, or components, that configure the email security system 102 to perform various operations described herein. For example, a classifier component 208 may be configured to perform operations of the classifier component 208 to determine a classification for an email, for example based on at least one of: (i) the email's header data, (ii) the email's subject, (iii) the email's body content, or (iv) data associated with one or more files attached to the email (e.g., data extracted using one or more attachment parsing operations). As another example, a feature set selector 210 may be configured to use the feature set mapping data 218 to determine a set of applicable maliciousness-related features for an email attachment based on the corresponding email classification and the attachment's format. As another example, an attachment evaluator 212 may be configured to perform operations of the attachment evaluation model 220 to apply the applicable feature set associated with an email attachment to determine whether the attachment is malicious. As another example, a prediction component 214 may be configured to perform operations of the prediction model 224 to process data associated with an email, such as maliciousness predictions associated with the email's attachments, to determine whether the email is malicious.

Figure 3:
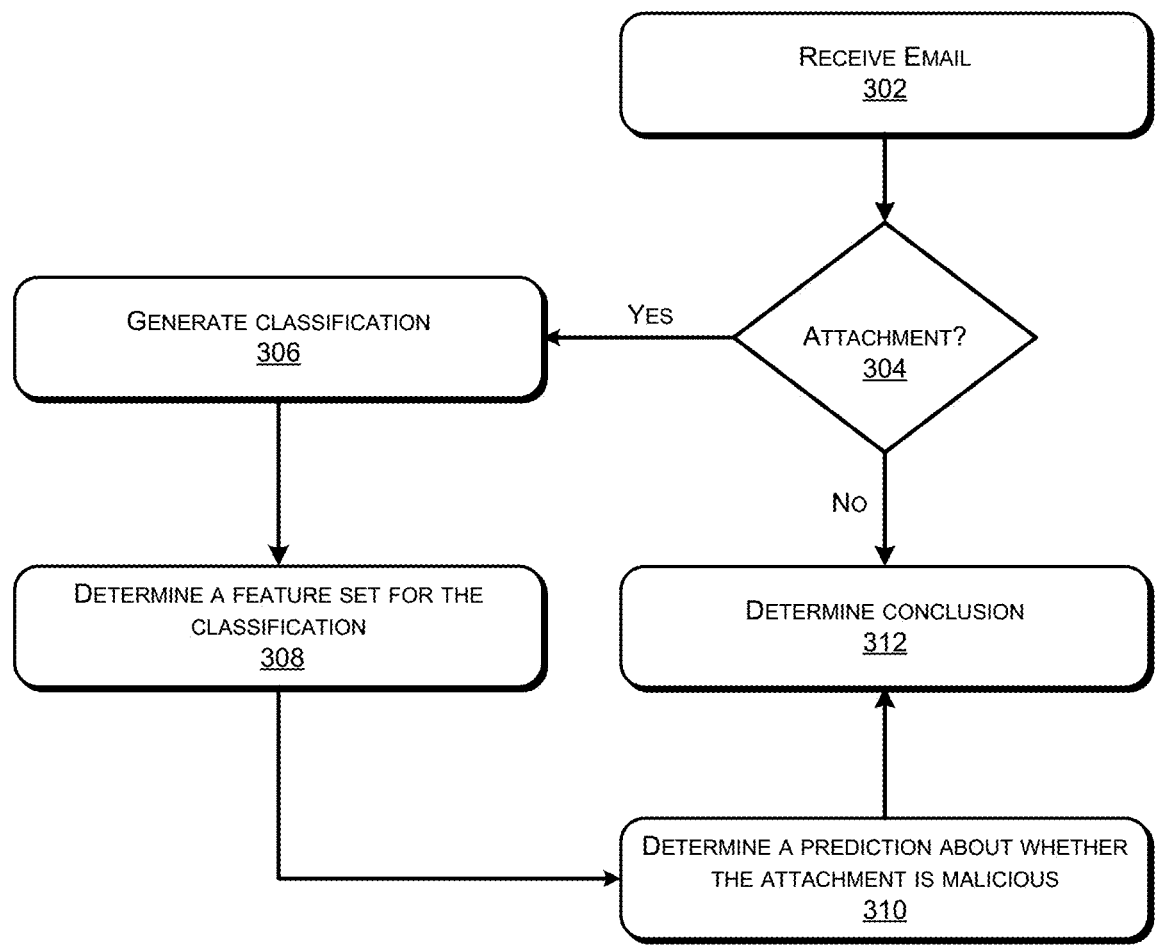
FIG. 3 is a flowchart diagram of an example process for determining a conclusion about whether an email is malicious.

FIG. 3 is a flowchart diagram of an example process 300 for determining a conclusion about whether an email is malicious. As depicted in FIG. 3, at operation 302, the email security system receives the email from an email service platform.

At operation 304, the email security system determines whether the email has an attachment. If the email has an attachment (operation 304—Yes), the email security system performs operations 306-310 with respect to the attachment (e.g., performs operations 306-310 once with respect to each attachment of the email). If the email does not have an attachment (operation 304—No), the email security system proceeds to operation 312 to perform the maliciousness conclusion based on data associated with the email. The data associated with the email may exclude any data about the email's attachments as the email is determined not to have any attachments.

At operation 306, the email security system generates a classification about the email. The classification may represent a semantic context associated with the email. Examples of candidate email classifications include a finance-related classification (e.g., including payment emails and/or bank communication emails), a classification related to information and/or communication mediums (e.g., including fax emails, memorandum emails, and/or voice-over-IP (VOIP) content emails), a classification related to office emails, a classification related to invoices (e.g., including emails with bills and/or receipts), a classification related to delivery matters (e.g., including logistics-related emails), and a classification related to call-to-action emails.

At operation 308, the email security system determines a set of maliciousness-related features associated with the email. The feature set associated with an email attachment may be specific to the combination of the classification (e.g., semantic classification) associated with the email that contains the attachment and the file format of the attachment. This allocation of feature sets to classification-format categories represents the understanding that a feature of a file format may be indicative of malicious activity if the file is used in a first context (e.g., attached to a file with a first classification) and not indicative of malicious activity if the file is used in a second context (e.g., attached to a file with a second classification).

At operation 310, the email security system determines whether the email attachment is malicious based on the set of maliciousness-related features associated with the email attachment that are satisfied by the email attachment. In some cases, the email security system applies the feature set determined for an email attachment to the email attachment to generate a set of maliciousness indicators. A maliciousness indicator may represent whether the attachment satisfies a rule that, when satisfied by the email attachment, indicates that the email attachment is malicious. In some cases, the email security system uses the set of maliciousness indicators associated with an email attachment to determine whether the email attachment is malicious. In some cases, the email security system determines that an email attachment is malicious is at least one maliciousness indicator associated with the email attachment has an affirmative value (e.g., indicating that the email attachment is predicted to be malicious).

At operation 312, the email security system determines whether the email is malicious based on data associated with the email, including data associated with the email's attachment(s) if the email has any attachments. For example, the email security system may determine that an email is malicious if the email includes any attachments that are determined to be malicious. As another example, the email security system may determine that an email is malicious if the percentage and/or number of the attachments included in the email that are determined to be malicious exceeds a threshold. If an email is determined to be malicious, one or more remedial actions may be performed. Examples of remedial actions include blocking the email from being displayed in an inbox of the receiver, harvesting data about a malicious email to generate a maliciousness detector model, storing attacker data associated with a malicious email in a blacklist associated with the email security system, reporting attacker data associated with a malicious email to authorities, and/or the like.

Figure 4:
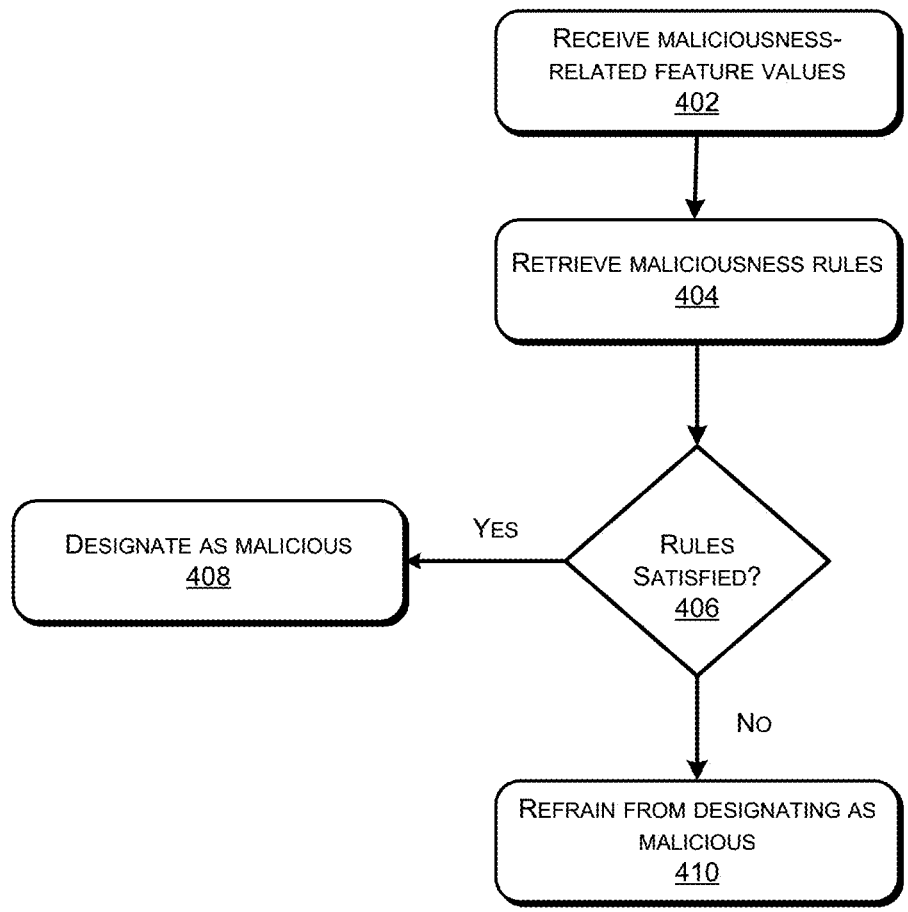
FIG. 4 is a flowchart diagram of an example process determining whether an email attachment is malicious.

FIG. 4 is a flowchart diagram of an example process 400 determining whether an email attachment is malicious. As depicted in FIG. 4, at operation 402, the email security system receives a set of maliciousness-related features associated with the email attachment. The feature set may be determined based on the corresponding email's classification and the attachment's format.

At operation 404, the email security system retrieves a set of rules for determining whether an email attachment associated with the corresponding email classification and attachment format is malicious. In some cases, the set of rules is defined for evaluating email attachments having the corresponding format that are attached to emails having the corresponding email classification. Examples of such maliciousness determination rules include a rule indicating that a PDF attachment in a finance-related email is malicious if the attachment contains JavaScript code and has more than three external links, a rule indicating a text document attachment in an invoice-related email is malicious if the attachment contains macros and embedded executables, a rule indicating an audio attachment in a training-related email is malicious if the metadata associated with the attachment does not match the file's content and if the attachment contains obfuscated code, and a rule indicating an attachment is malicious if the result of processing the feature set associated with the attachment using a machine learning model generates an output indicating that the attachment is malicious.

At operation 406, the email security system determines whether a threshold number (e.g., one) of the retrieved rules is satisfied. In some cases, the result of applying a set of R rules to the email attachment is R maliciousness indicators, where each maliciousness indicator of the R maliciousness indicators may represent whether the result of applying a corresponding one of the R rules to the email attachment returns a result indicating that the email attachment is malicious. In some cases, the email security system determines that the attachment satisfies the set of rules if at least one maliciousness indicator associated with the email attachment has an affirmative value (e.g., indicating that the email attachment is predicted to be malicious). In some cases, the email security system determines that the attachment satisfies the result of rules if at least N maliciousness indicators associated with the email attachment have affirmative values (e.g., indicating that the email attachment is predicted to be malicious), where N may be defined by configuration data associated with the email management system.

If the email security system determines that the set of rules are satisfied by the attachment (operation 406—Yes), the email security system proceeds to operation 408 to designate the email attachment as malicious. If the email security system determines that the set of rules are not satisfied by the attachment (operation 406—No), the email security system proceeds to operation 410 to refrain from designating the email attachment as malicious.

Figure 5:
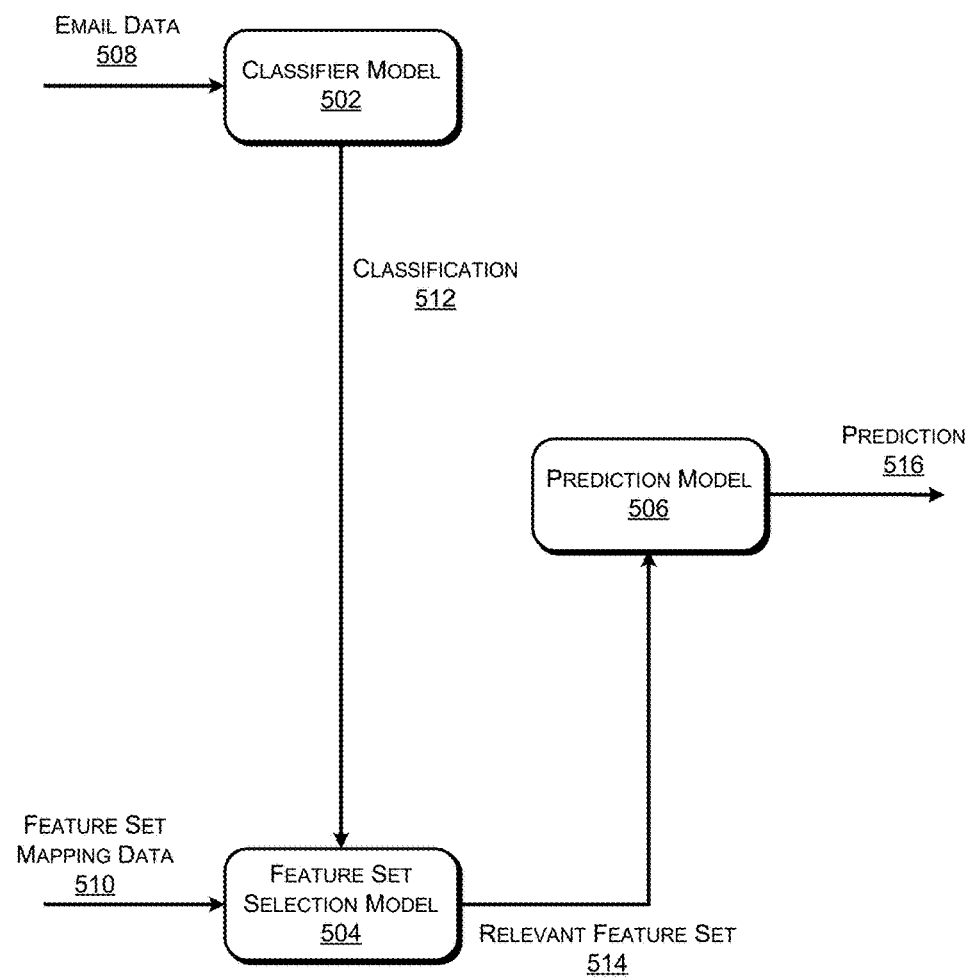
FIG. 5 provides an operational example of an architecture for a set of models that are configured to collectively determine whether an email attachment is malicious.

FIG. 5 provides an operational example of an architecture 500 for a set of models that are configured to collectively determine whether an email attachment is malicious. As depicted in FIG. 5, the architecture 500 includes a classifier model 502 that processes email data 508 associated with an email attachment to determine a classification 512 associated with a corresponding email. The classification 512 may represent a semantic context associated with the email. In some cases, the email data 508 includes at least one of: (i) the email's header data, (ii) the email's subject, (iii) the email's body content, or (iv) data associated with one or more files attached to the email (e.g., data extracted using one or more attachment parsing operations).

As further depicted in FIG. 5, the architecture 500 includes a feature set selector model 504 that selects a relevant feature set 514 associated with the email attachment from feature sets identified by the feature set mapping data 510 and based on the classification 512 generated by the classifier model 502. The feature set mapping data 510 may include data mapping each pairing of an email classification and an attachment format to a set of applicable maliciousness-related features. Accordingly, the relevant feature set 514 associated with an email attachment may be specific to the corresponding email classification 512 and the format of the email attachment.

As further depicted in FIG. 5, architecture 500 includes a prediction model 506 that is configured to apply the relevant feature set 514 to the email attachment to determine a prediction 516 about whether the email attachment is malicious. The prediction model 506 applies the feature set determined for an email attachment to the email attachment to generate a set of maliciousness indicators. A maliciousness indicator may represent whether the attachment satisfies a rule that, when satisfied by the email attachment, indicates that the email attachment is malicious. In some cases, the prediction model 506 uses the set of maliciousness indicators associated with an email attachment to determine whether the email attachment is malicious. In some cases, the prediction model 506 determines that an email attachment is malicious is at least one maliciousness indicator associated with the email attachment has an affirmative value (e.g., indicating that the email attachment is predicted to be malicious).

In some cases, in addition to and/or instead of using determinations about maliciousness of attachments, the prediction model 506 predicts whether an email is malicious based on a header anomaly in the header data associated with the email. The header anomaly may represent at least one of a mismatch between a sender address and a reply-to address, a sending IP address associated with a malicious domain, or an invalid date in the header data.

Figure 6:
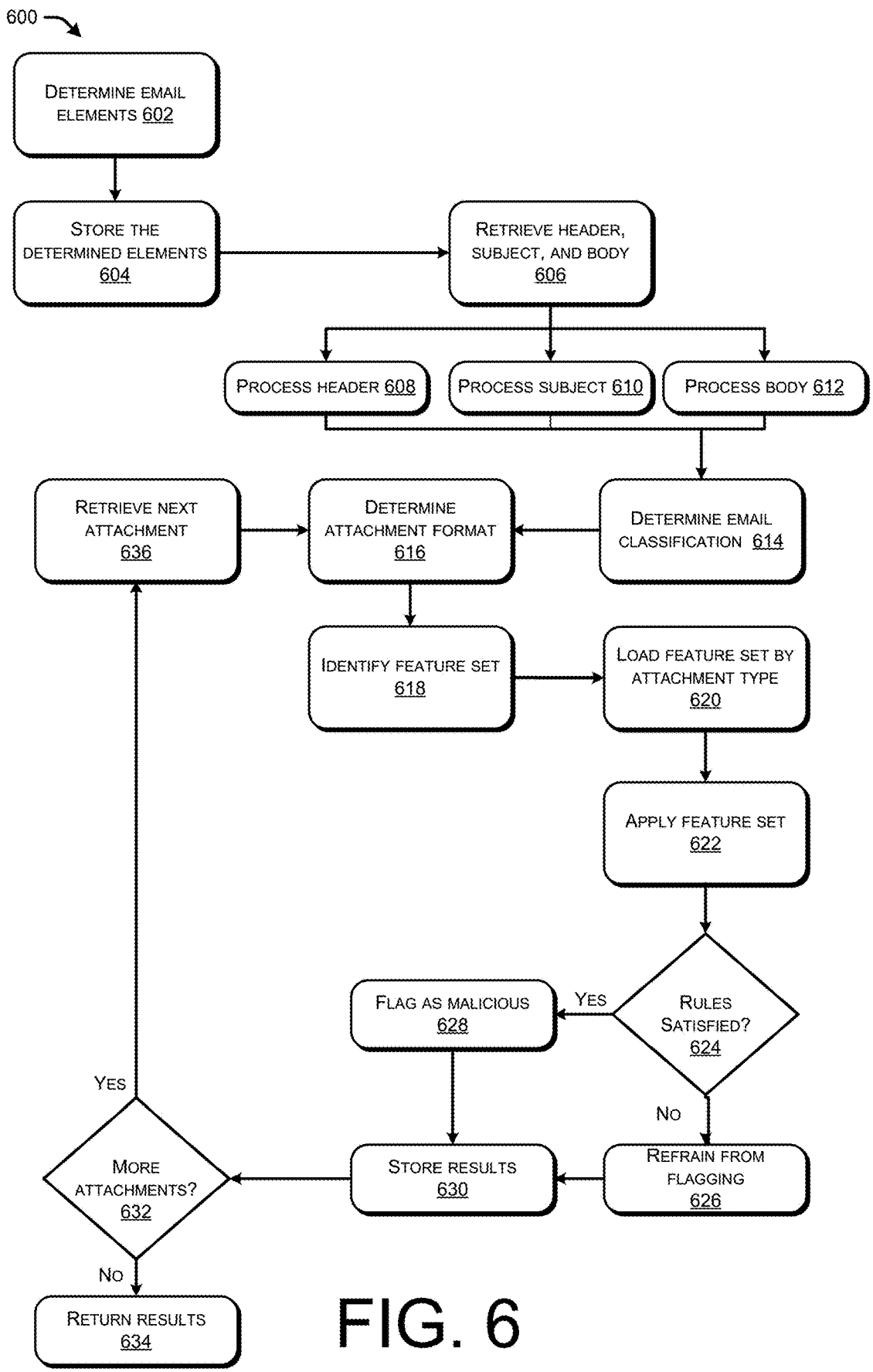
FIG. 6 is a flowchart diagram of an example process for determining whether an email is malicious.

FIG. 6 is a flowchart diagram of an example process 600 for determining whether an email is malicious. As depicted in FIG. 6, at operation 602, the email security system determines the elements of the email, including the header, subject, body, and any attachments.

At operation 604, the email security system stores the email elements for analysis. The email elements may be stored on a computer-readable storage medium, such as a local and/or a remote computer-readable storage medium. The computer-readable storage medium may be a volatile and/or a non-volatile computer-readable storage medium.

At operation 606, the email security system retrieves the email elements from the computer-readable storage medium. Operation 606 may be performed periodically and/or in response to a request to determine whether the email is malicious (e.g., a request received from an email server, such as a request associated with at least one of the Simple Mail Transfer Protocol (SMTP), the Post Office Protocol (POP), or the Internet Message Access Protocol (IMAP)).

At operation 608, the email security system processes the header of the email to determine whether the header provides an indication that the email is likely to be malicious. In some cases, the indication is determined based on header data such as sender address, recipient address, email timestamp, and/or the like.

At operation 610, the email security system processes the subject of the email to determine whether the subject provides an indication that the email is likely to be malicious. In some cases, the indication is determined based on words and/or keywords used in the subject. In some cases, the indication is determined based on a length of the subject and/or based on the output of performing sentiment analysis on the subject.

At operation 612, the email security system processes the body of the email to determine whether the body provides an indication that the email is likely to be malicious. In some cases, the indication is determined based on words and/or keywords used in the body. In some cases, the indication is determined based on the length of the body and/or based on the output of performing sentiment analysis on the body.

At operation 614, the email security system determines a classification associated with the email. The classification may represent a semantic context associated with the email. In some cases, the email security system determines the classification associated with an email based on at least one of: (i) the email's header data, (ii) the email's subject, (iii) the email's body content, or (iv) data associated with one or more files attached to the email (e.g., data extracted using one or more attachment parsing operations).

At operation 616, the email security system determines the file format of an attachment associated with the email. The format of a file may be determined based on one or more metadata fields associated with the file, such as one or more of the file's extension, the file's subject matter, the type of software application within which the file can be opened, the file's metadata tags, or other indicators within the file itself.

At operation 618, the email security system identifies a feature set associated with the attachment based on the attachment format and the email's classification. The feature set associated with an email attachment may be specific to the combination of the classification (e.g., semantic classification) associated with the email that contains the attachment and the file format of the attachment.

At operation 620, the email security system loads the identified feature set. Loading the feature set may include retrieving the set of features from a database, initializing any models or tools needed to apply the feature set, and preparing the email security system to analyze the attachment according to the patterns, rules, and/or heuristics defined in the feature set. For example, loading a feature set for a PDF document may involve initializing a PDF parser, a JavaScript analyzer, a natural language processing module to detect suspicious keywords, and/or a metadata inspection tool.

At operation 622, the email security system applies the feature set to the email attachment to determine a set of maliciousness indicators. A maliciousness indicator may represent whether the attachment satisfies a rule that, when satisfied by the email attachment, indicates that the email attachment is malicious. For example, a maliciousness indicator may indicate whether a PDF attachment to a finance-related email includes a macro or an embedded object.

At operation 624, the email security system determines whether the maliciousness indicators indicate that at least a threshold number (e.g., one) of a set of maliciousness determination rules associated with the email attachment are satisfied. The set of maliciousness determination rules may be specific to the email's classification and the attachment's format.

If the email security system determines that a threshold number (e.g., one) of the set of maliciousness determination rules associated with the email attachment are not satisfied (operation 624—No), then the email security system proceeds to operation 626 to refrain from flagging the email attachment as malicious. If the email security system determines that a threshold number (e.g., one) of the set of maliciousness determination rules associated with the email attachment are satisfied (operation 624—Yes), then the email security system proceeds to operation 628 to flag the email attachment as malicious. The result of operation 626 or 628 (e.g., an indicator of whether the email attachment is predicted to be malicious) is stored at operation 630.

At operation 632, the email security system determines whether the email includes any more attachments. If the email does not include any more attachments (operation 632—No), then the email security system proceeds to operation 634 to determine whether the email is malicious based on the results stored at operation 630 and the processing outputs determined at operations 608-612. If the email includes more attachments (operation 632—Yes), then the email security system proceeds to operation 636 to retrieve the attachments and repeats operations 616-630 with respect to the newly-retrieved attachment.

Figure 7:
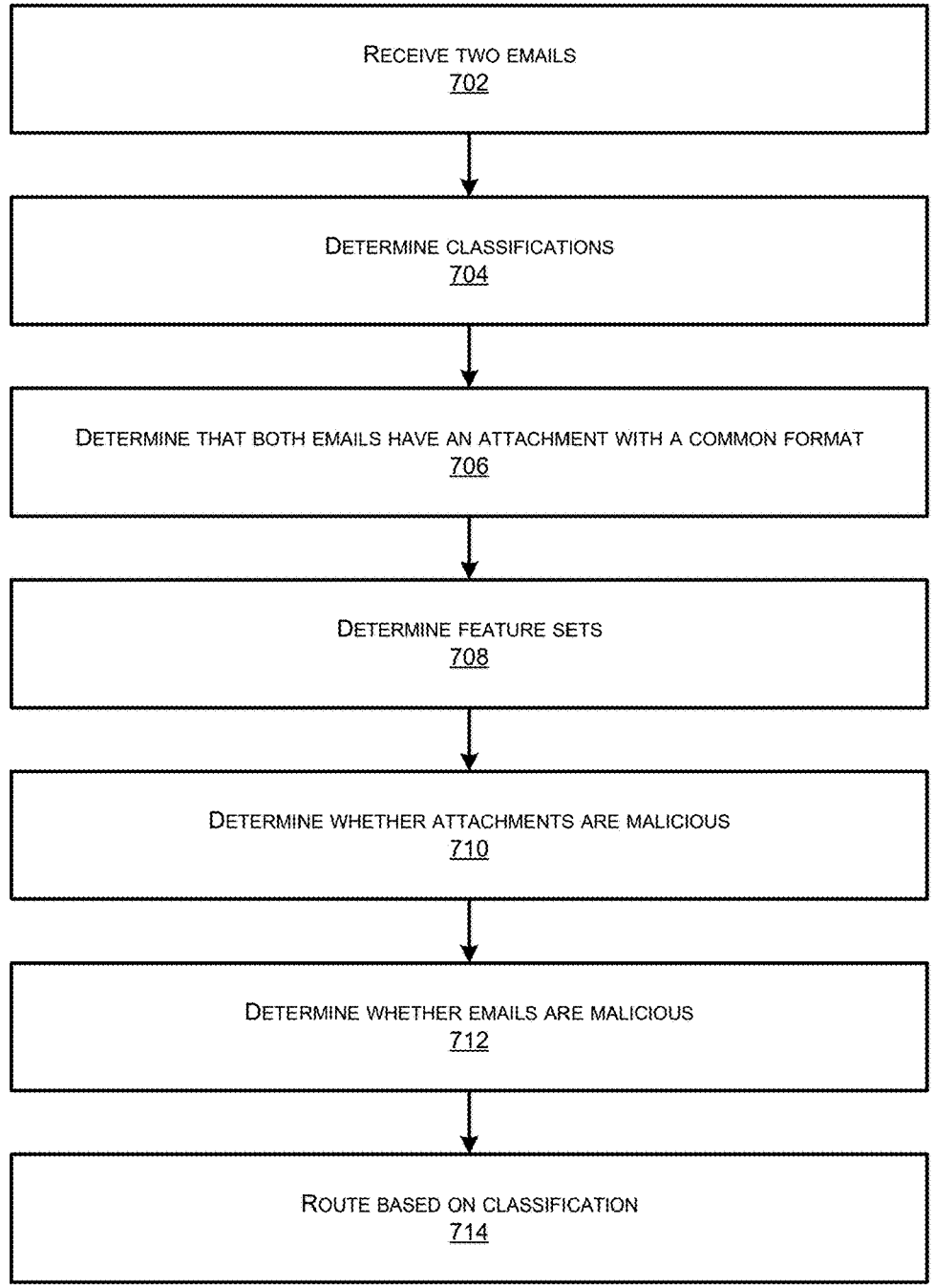
FIG. 7 is a flowchart diagram of an example process for routing two emails based on determinations about whether those two emails are malicious.

FIG. 7 is a flowchart diagram of an example process 700 for routing two emails based on determinations about whether those two emails are malicious. As depicted in FIG. 7, at operation 702, the email security system receives the two emails.

At operation 704, the email security system determines a first classification for the first email and a second classification for the second email. In some cases, the email security system determines the classification associated with an email based on at least one of: (i) the email's header data, (ii) the email's subject, (iii) the email's body content, or (iv) data associated with one or more files attached to the email (e.g., data extracted using one or more attachment parsing operations).

At operation 706, the email security system determines that the first email includes a first attachment with a first format and the second email includes an attachment with the same first format. Accordingly, the email security system may determine that the two emails have attachments with a common file format.

At operation 708, the email security system determines a first feature set associated with the first email and a second feature set associated with the second set. The first feature set may be specific to the first classification associated with the first email and the first format. The second feature set may be specific to the second classification associated with the first email and the first format. The first feature set may include a first feature that is not in the second feature. For example, the first format may be a PDF format, and the first feature may be related to presence or absence of macros within a PDF attachment.

At operation 710, the email security system determines whether the first attachment and the second attachment are malicious. For example, the email security system may determine that the first attachment is malicious but the second attachment is not, even though both attachments satisfy a rule and/or a condition associated with the first feature. This may be because the first feature is not deemed relevant to maliciousness of the second attachment given its context as defined by the second classification associated with the second email.

At operation 712, the email security system determines whether the two emails are malicious. The determination about whether the first email is malicious may be based at least in part on whether the first attachment is malicious. Similarly, the determination about whether the second email is malicious may be based at least in part on whether the second attachment is malicious. For example, the email security system may determine that the first email is malicious but the second email is not malicious.

At operation 714, the email security system routes the emails based on the determinations about whether those emails are malicious. For example, if the email security system determines that the first email is malicious, the email security system may refrain from routing the first email to a destination device (e.g., by preventing transmission of the email to the destination device). As another example, if the email security system determines that the second email is malicious, the email security system may route the second email to a destination device. In some cases, if an email is detected to be malicious, the email security system may perform one or more remedial actions accordingly. Examples of remedial actions include blocking the email from being displayed in an inbox of the receiver, harvesting data about a malicious email to generate a maliciousness detector model, storing attacker data associated with a malicious email in a blacklist associated with the email security system, reporting attacker data associated with a malicious email to authorities, and/or the like.

Figure 8:
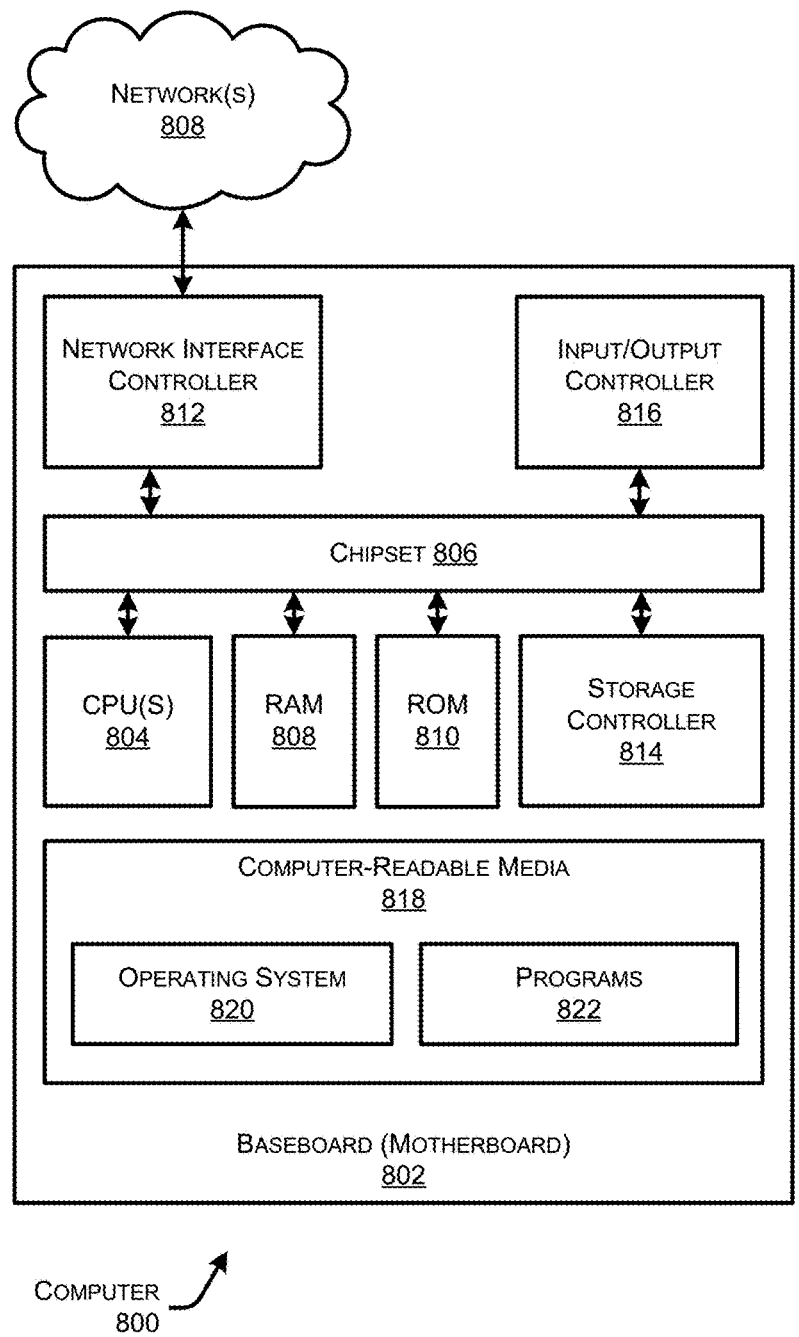
FIG. 8 shows an example computer architecture for a computer capable of executing program components for implementing the functionality described above.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a physical server that is included in the email security system 102 described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 108. The chipset 806 can include functionality for providing network connectivity through a NIC 812, such as a gigabit Ethernet adapter. The NIC 812 is capable of connecting the computer 800 to other computing devices over the network 108. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations are performed by devices in a distributed application architecture, and or any components included therein, may be supported by one or more devices similar to computer 800. Stated otherwise, some or all of the operations performed by the email security system 102, and or any components included therein, may be performed by one or more computers 800 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, by a processor, first text data associated with a first email and second text data associated with a second email;
providing, by the processor, the first text data and the second text data to a first model;
receiving, by the processor, a first classification associated with the first email and a second classification associated with the first email from the first model;
determining, by the processor, that the first email includes a first attachment file associated with a first format;
determining, by the processor, that the second email includes a second attachment file associated with the first format;
determining, by the processor, a first feature set associated with the first classification in relation to the first format and a second feature set associated with the second classification in relation to the first format, wherein the first feature set comprises a first feature and the second feature set excludes the first feature;
determining, by the processor, that the first attachment file and the second attachment file both satisfy a rule associated with the first feature;
determining, by the processor, that the first email is malicious and the second email is not malicious;
preventing, by the processor, transmission of the second email to a first destination device; and
enabling, by the processor, transmission of the second email to a second destination device.

2. The method of claim 1, wherein:
the first format is a text format, and
the first feature set comprises a first feature representing whether a file associated with the first format that is attached to an email associated with the first classification includes at least one of an automated code or an embedded object.

3. The method of claim 1, wherein:
the first format is a web document format; and
the first feature set comprises a first feature representing whether a file associated with the first format that is attached to an email associated with the first classification includes at least one of an embedded object, encrypted data, automated redirection code, or an external link.

4. The method of claim 1, wherein;
the first feature set comprises a first feature representing whether a file associated with the first format that is attached to an email associated with the first classification includes an input-receiving field.

5. The method of claim 1, further comprising:
determining, by the processor, that the first email includes a third attachment file associated with a second format;
determining, by the processor, a third feature set associated with the first classification in relation to the second format; and
determining, by the processor, that the first email is malicious based on the first feature set and the third feature set.

6. The method of claim 1, wherein the first model comprises a Latent Dirichlet Analysis (LDA) model.

7. The method of claim 1, wherein the first model comprises a transformer-based natural language processing model.

8. The method of claim 1, further comprising:
extracting, by the processor, first header data from the first email;
determining, by the processor, a header anomaly based on the first header data; and
determining, by the processor, that the first email is malicious based further on the header anomaly.

9. The method of claim 8, wherein the header anomaly comprises at least one of:
a mismatch between a sender address and a reply-to address,
a sending Internet Protocol (IP) address associated with a malicious domain, or
an invalid date in the first header data.

10. The method of claim 1, further comprising:
extracting, by the processor, a link from the first email;
accessing, by the processor, content associated with the link;
providing, by the processor, the content to the first model; and
receiving, by the processor, a link classification for the content from the first model, wherein determining that the first email is malicious is further based on the link classification.

11. A system comprising:
one or more processors; and
one or more non-transitory computer-readable media storing computer-executable instructions that, when executed by the one or more processors, cause the one or more processors to perform operations comprising:
receiving first text data associated with a first email and second text data associated with a second email;
providing the first text data and the second text data to a first model;
receiving a first classification associated with the first email and a second classification associated with the first email from the first model;
determining that the first email includes a first attachment file associated with a first format;
determining that the second email includes a second attachment file associated with the first format;
determining a first feature set associated with the first classification in relation to the first format and a second feature set associated with the second classification in relation to the first format, wherein the first feature set comprises a first feature and the second feature set excludes the first feature;
determining that the first attachment file and the second attachment file both satisfy a rule associated with the first feature;
determining that the first email is malicious and the second email is not malicious;
preventing transmission of the second email to a first destination device; and
enabling transmission of the second email to a second destination device.

12. The system of claim 11, wherein:
the first format is a text format, and
the first feature set comprises a first feature representing whether a file associated with the first format that is attached to an email associated with the first classification includes at least one of an automated code or an embedded object.

13. The system of claim 11, wherein:
the first format is a web document format; and
the first feature set comprises a first feature representing whether a file associated with the first format that is attached to an email associated with the first classification includes at least one of an embedded object, encrypted data, automated redirection code, or an external link.

14. The system of claim 11, wherein;
the first feature set comprises a first feature representing whether a file associated with the first format that is attached to an email associated with the first classification includes an input-receiving field.

15. The system of claim 11, the operations further comprising:
determining that the first email includes a third attachment file associated with a second format;
determining a third feature set associated with the first classification in relation to the second format; and
determining that the first email is malicious based on the first feature set and the third feature set.

16. One or more non-transitory computer-readable media storing computer-executable instructions that, when executed by one or more processors, cause the one or more processors to perform operations comprising:
receiving first text data associated with a first email and second text data associated with a second email;
providing the first text data and the second text data to a first model;
receiving a first classification associated with the first email and a second classification associated with the first email from the first model;
determining that the first email includes a first attachment file associated with a first format;
determining that the second email includes a second attachment file associated with the first format;
determining a first feature set associated with the first classification in relation to the first format and a second feature set associated with the second classification in relation to the first format, wherein the first feature set comprises a first feature and the second feature set excludes the first feature;
determining that the first attachment file and the second attachment file both satisfy a rule associated with the first feature;
determining that the first email is malicious and the second email is not malicious;
preventing transmission of the second email to a first destination device; and
enabling transmission of the second email to a second destination device.

17. The one or more non-transitory computer-readable media of claim 16, wherein:
the first format is a text format, and
the first feature set comprises a first feature representing whether a file associated with the first format that is attached to an email associated with the first classification includes at least one of an automated code or an embedded object.

18. The one or more non-transitory computer-readable media of claim 16, wherein:
the first format is a web document format; and
the first feature set comprises a first feature representing whether a file associated with the first format that is attached to an email associated with the first classification includes at least one of an embedded object, encrypted data, automated redirection code, or an external link.

19. The one or more non-transitory computer-readable media of claim 16, wherein;
the first feature set comprises a first feature representing whether a file associated with the first format that is attached to an email associated with the first classification includes an input-receiving field.

20. The one or more non-transitory computer-readable media of claim 16, the operations further comprising:
determining that the first email includes a third attachment file associated with a second format;
determining a third feature set associated with the first classification in relation to the second format; and
determining that the first email is malicious based on the first feature set and the third feature set.

* * * * *